United States Patent [19]
Zook

[11] Patent Number: 5,761,220
[45] Date of Patent: Jun. 2, 1998

[54] MINIMUM LATENCY ASYNCHRONOUS DATA PATH CONTROLLER IN A DIGITAL RECORDING SYSTEM

[75] Inventor: Christopher P. Zook, Longmont, Colo.

[73] Assignee: Cirrus Logic, Inc., Fremont, Calif.

[21] Appl. No.: 853,520

[22] Filed: May 9, 1997

Related U.S. Application Data

[63] Continuation of Ser. No. 308,179, Sep. 19, 1994, abandoned.

[51] Int. Cl.⁶ .................................................. G11C 29/00
[52] U.S. Cl. ................ 371/40.2; 371/37.7; 371/40.12
[58] Field of Search .......................... 371/37.7, 40.2, 371/40.12

[56] References Cited

U.S. PATENT DOCUMENTS

| | | | |
|---|---|---|---|
| 4,494,234 | 1/1985 | Patel | 371/38 |
| 4,730,321 | 3/1988 | Machado | 371/38 |
| 4,733,396 | 3/1988 | Baldwin et al. | |
| 4,833,679 | 5/1989 | Anderson et al. | 371/38 |
| 4,835,775 | 5/1989 | Seroussi | 371/37 |
| 4,849,975 | 7/1989 | Patel | 371/38 |
| 4,866,716 | 9/1989 | Weng | 371/37.1 |
| 4,890,287 | 12/1989 | Johnson et al. | 371/37.2 |
| 4,920,539 | 4/1990 | Albonesi | 371/40.2 |
| 5,241,546 | 8/1993 | Peterson et al. | 371/37.1 |
| 5,243,604 | 9/1993 | Tsang et al. | 371/40.1 |
| 5,267,241 | 11/1993 | Kowal | 371/5.3 |
| 5,280,488 | 1/1994 | Glover et al. | 371/37.1 |
| 5,384,786 | 1/1995 | Dudley et al. | 371/37.1 |
| 5,537,421 | 7/1996 | Dujari et al. | 371/37.1 |

Primary Examiner—Reba I. Elmore
Assistant Examiner—McDievnel Marc
Attorney, Agent, or Firm—Howard H. Sheerin; Dan A. Shifrin

[57] ABSTRACT

An asynchronous data path controller for reading, correcting, and transferring data on-the-fly from a digital recording device to a host system. Central to the data path controller is a RAM for storing the data as it is read from the recording device and a RAM controller for arbitrating access to the RAM. An error correcting system reads the data from the RAM, corrects the data, and then restores the corrected data back to the RAM before it is transferred to the host system. The error correcting system includes an error syndrome generator and a error location and error value generator. In a first embodiment, the data codewords, comprised of user data and redundancy symbols, are stored from the recording device into the RAM. The error syndrome generator reads the codewords from the RAM, generates error syndromes, and transfers the error syndromes to the error location and error value generator. In an alternative embodiment, the error syndrome generator receives the codewords directly from the recording device. Only the user data and the error syndromes are stored into the RAM. In both embodiments, uncorrected data is read from the RAM, corrected in response to the error syndromes, and the corrected data stored into the RAM for subsequent transfer to the host system. The steps of reading data from the recording device, correcting it, and transferring it to the host occurs concurrently and asynchronously.

13 Claims, 4 Drawing Sheets

MINIMUM LATENCY ASYNCHRONOUS DATA PATH CONTROLLER IN A DIGITAL RECORDING SYSTEM

This application is a continuation of application Ser. No. 08/308,179, filed Sep. 19, 1994, now abandoned.

FIELD OF INVENTION

The present invention relates to computer technology and, more specifically, to the control of data acquisition and correction in digital recording systems.

BACKGROUND OF THE INVENTION

In digital recording systems (including storage and retrieval from optical or magnetic media), a data path controller coordinates data transfer between a recording device and a host device. Typically, the data path controller includes an error correcting system to correct errors in the data before passing it to the host. The total time to retrieve data from the recording device, correct it, and provide it to the host is known as the "access time", a well recognized measure of the efficiency of the overall storage system. Most data path controllers can transfer data on-the-fly meaning that data is continuously read from the recording device, corrected, and transferred to the host without pausing. For these systems, the "access time" is a measure of the latency between the time a read command is initiated and the time data begins to appear at the host interface.

In the prior art there are data path controllers which minimize the "access time" by minimizing the latency required to read, correct, and transfer the data. To achieve minimum latency, the prior art techniques synchronize the steps of reading data from the recording device, correcting the data, and transferring it to the host. For example, in the prior art data path controller shown in FIG. 1, digital data is read from the recording device 2 and transferred over line 4 to a buffer 6. The data is also transferred, simultaneously, to an error correcting system 8. The error correcting system is typically comprised of a syndrome generator 10 and an error locator and value generator 12. The syndrome generator receives the data from the recording device and, if the data contains errors, generates error syndromes. These error syndromes are then transferred over line 11 to the error locator and value generator. The error locator and value generator 12 locates the position of the errors in the data and determines the correct value. Then, as the data is transferred out of the buffer 6, an adder circuit 14 adds the data with the correction values (modulo-two), and the corrected data is transferred to the host 16.

The operation of this type of conventional data path controller is synchronous in that new data is read into the buffer 6 synchronously with data being corrected and transferred to the host 16. The problem with this technique is that the error correcting system 8 must operate fast enough to keep up with the transfer rate when consecutive errors occur. For example, if a current data block contains errors that cause error syndromes, and the following data block also contains errors, then the error correcting system must complete correction of the current block before starting the next block in order to maintain on-the-fly correction. If the error correcting system cannot operate at the data rate, then the read operation must pause (i.e., not on-the-fly) until the error correcting system is ready to accept more data. To ensure that the error correcting system can keep up with the data rate, the prior art systems typically employ pipelining, or complex circuitry, or a combination of both.

To pipeline the error correcting system, the error correction process is broken into a sequence of pipelined stages. For instance, the error locator and value generator 12 may be implemented in several sequential steps. Each step represents a stage in the pipeline so that as current data(n) is processed by the current $step_n$, previous data(n−1) is processed by the next $step_{n+1}$. Hence, the speed of the error correcting system as a whole is limited by the maximum throughput of the longest step. In other words, this technique requires that each stage of the pipeline keep up with the data rate rather than the entire error correcting system. If one of the stages is too slow, it is broken into two or more further stages. Although this technique results in on-the-fly operation, it can become overly complex as the number of necessary stages increases. Further, the latency increases as the length of the pipeline increases.

Rather than break a stage into more steps, the stage can be shortened by using complex circuitry. Most error correcting systems (such as Reed Solomon decoding) utilize complex arithmetic algorithms. Arithmetic operations, such as multiplication or division, can be implemented in several sequential pipelined steps, or in one step using combinatorial logic. However, the large number of logic gates necessary to implement a complex arithmetic operation in combinatorial logic is not cost effective.

These prior art data path controllers are even less suitable for processing complicated error correction codes such as product codes (the error correction codes commonly used in CD ROM systems). The data in product codes is represented as an array of codewords (i.e., rows and columns of codewords). To correct the data, the error correcting algorithm is applied first on the rows, then on the columns, then again on the rows and columns. This process continues until the codewords are corrected or determined to be uncorrectable. This recursive process, of course, increases the delay of the error correcting system. If the data path controller is operating synchronously with the data transfer, it must be overly complex to operate on-the-fly.

Thus, it is a general object of the present invention to transfer data on-the-fly from a storage device to a host device using a data path control system incorporating an error correction system that does not require a complex pipeline nor complex circuitry. Additionally, it is an object to minimize the latency between the time a read command is initiated and the time data begins to appear at the host interface.

SUMMARY OF THE INVENTION

The objects of the present invention are achieved through a novel asynchronous data path control system which operates on-the-fly with conventional error correcting capabilities. The data path control system is asynchronous in that it reads data from the recording device, corrects the data, and transfers the corrected data to the host in operations that are independent of each other, rather than in contiguous synchronized steps. Consequently, each step in the error correcting system is designed to operate at the average time necessary to correct a block of data rather than the maximum time necessary. This allows the error correcting system to have a pipeline with fewer stages thereby minimizing the transfer latency. Further, the circuitry required to implement each stage is less complex. The result is a more efficient and cost effective data path controller.

Central to the operation of the data path controller of the present invention is a large random access memory (RAM) for storing the data as it is read from the recording device.

Rather than process data as it is read from the recording device, the error correcting system accesses the data from the RAM. Consequently, the error correcting system does not operate synchronous with the data transfer from the recording device. That is, the error correcting system does not operate as fast as prior art systems, but still provides on-the-fly operation. For instance, if the RAM stores ten data blocks and one of the data blocks contains an error, then the error correcting system must correct the bad block in the time it takes to read ten blocks from the storage device. Hence, the required speed of the error correcting system is proportional to the fraction of the RAM that holds erroneous data blocks in the worst case scenario. Obviously if all the data blocks in the RAM contain errors, then the data path controller must pause. Normally, however, only a few data blocks out of several will contain errors. Therefore, the error correcting system can be designed to operate with a relatively short pipeline having simplified circuitry.

In an alternative embodiment, the error correcting system processes data as it is read from the recording device, but only the syndromes are generated. Rather than immediately processing the error syndromes to determine error locations and correction values, the error syndromes are stored in the RAM. This prevents a bottleneck if the error location and value generator is not ready to process the next error syndromes. When the error location and value generator is ready to process the syndromes, they are read from RAM and the corresponding data block is corrected. This embodiment is more efficient because the error syndromes are computed as the data is read from the recording device. In the previous embodiment, the data from the recording device is first stored to RAM, and then read from RAM to generate the error syndromes. This additional memory access increases the overall delay of the data path controller.

The other component central to the data path controller of the present invention is the RAM controller that provides RAM access to the storage device, the error correcting system, and the host. Since the RAM is accessed through a common bus, the RAM controller must arbitrate access to the RAM. Additionally, the RAM controller coordinates where data from the storage device should be stored in the RAM, what data the error correcting system should be processing, where the corrected data should be stored back into the RAM, and where in RAM corrected data is available for transfer to the host. The RAM can be controlled as a large ring buffer, or alternatively, as a FIFO stack. In any case, the RAM controller executes a program that keeps the data path controller operating on-the-fly.

The RAM can also be used as memory for a cache system. When the host initiates a read of sector A, the following contiguous sectors B, C, and D can also be read into the RAM. Since there is a high probability that a subsequent read will be for the next contiguous sector, it will already be in the RAM and can be transferred immediately.

The foregoing, and other features and objects of the present invention and the manner of attaining them will become more apparent, and the invention itself will be best understood by reference to the following description of a preferred embodiment taken in conjunction with the accompanying drawings.

DETAILED DESCRIPTION OF THE DRAWINGS

Figure 2A:
FIG. 2A shows the format of a typical codeword.

In most error correcting systems employed in digital recording (such as optical or magnetic recording), user data is first encoded into codewords before written to the storage medium. A typical format of a codeword is shown in FIG. 2A. The codeword is comprised of user data and redundancy symbols, where the redundancy symbols are used to detect and correct errors in the data caused by noise in the recording channel. When the data is read back from the storage medium, the error correcting system process the codewords to generate error syndromes. A non-zero syndrome indicates that the codeword contains an error. The error syndromes also provide information about the location and value of the error. Thus, the error correcting system utilizes the syndromes to detect, locate, and correct errors in the data before transferring it to the host system. If the errors cannot be corrected, then the data is re-transmitted from the recording device.

Figure 1:
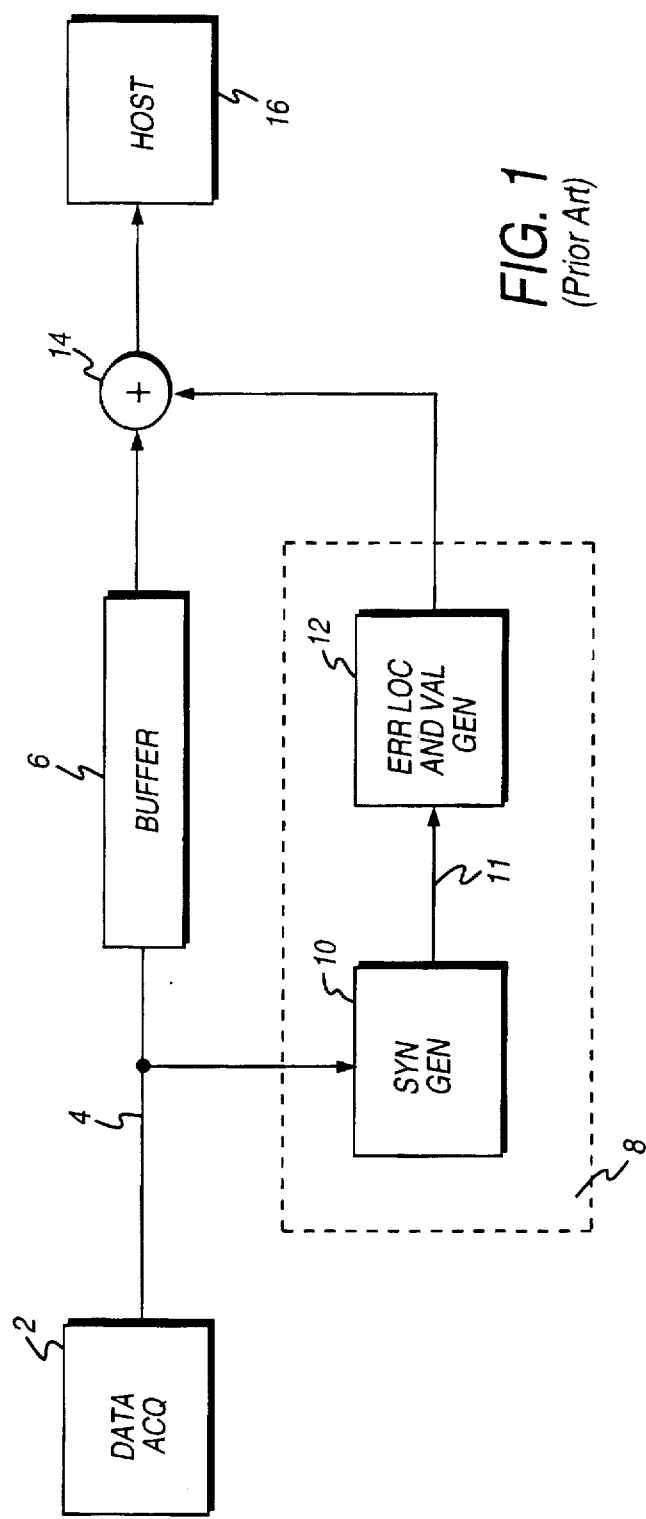
FIG. 1 is a typical format of a data codeword utilized in digital recording systems comprised of user data and redundancy symbols.

A data path controller incorporating an error correcting system coordinates the transfer between the recording device and host system. Conventional data path controllers incorporate an error correcting system that operates synchronous with data transferred from the recording device. As shown in FIG. 1, a continues stream of data from the recording device 2 is applied over line 4 to a buffer and, simultaneously, to an error correcting system 8. A syndrome generator 10 generates error syndromes in response to the data codewords. The error syndromes, then, are used by an error locator and value generator 12 to determine the location of the error in the codeword and a correction value. As the corrupted codeword is transferred out of the buffer 6, it is corrected at adder 14 with the correction value. The corrected data is then transferred to the host system.

As discussed in the background above, these types of conventional synchronous data path controllers require the error correcting system to operate at the data rate in order to achieve on-the-fly operation when an error occurs in two contiguous codewords. Otherwise, the data transfer must pause, resulting in a significant increase in the storage system's overall access-time. To achieve on-the-fly operation, the error correcting process is divided into pipelined stages so that the throughput is defined by the longest stage. Also, the speed of a particular stage can be increased by using complex circuitry such as numerous combinatorial logic gates.

Figure 2B:
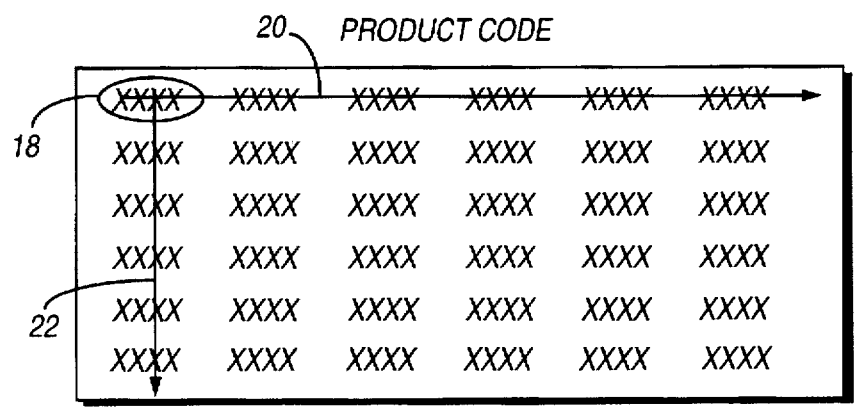
FIG. 2B shows the format of a product code.

Some storage systems, such as CD ROM, employ more complex error coding known as product codes. The format of a product code is shown in FIG. 2B. The user data is stored in rows and columns of codewords where each byte of data is contained in two data words. For instance, the first byte of data 18 is stored in the first row codeword 20 and the first column codeword 22. One method for error correcting product codes applies the correction first on the row codewords and then on the column codewords. If after applying the correction to the row codewords there are uncorrectable errors detected, those errors may still be corrected when the correction is applied to the column codewords. Similarly, uncorrected errors detected after the correction is applied to the columns may be corrected by applying the correction again to the rows. This recursive error correcting process increases significantly the reliability of the storage system.

However, this recursive process also increases the overall delay in the data path controller, creating the need for faster synchronous error correcting, or, as in the present invention, an asynchronous error correcting system.

The asynchronous data path controller of the present invention relies on the assumption that in most storage systems only a few codewords, out of many codewords, will be in error. Rather than correct the codewords synchronously as they are transferred from the recording device, the codewords are stored into a RAM capable of holding several codewords. The error correcting system then reads one of the codewords from the RAM and performs the following steps:

1. determines if the codeword contains an error;
2. locates and determines correction values for the error;
3. corrects the codeword;
4. stores the codeword back into the RAM.

These steps occur asynchronous with data transfer from the recording device. Therefore, it is unnecessary for the error correction of a current codeword be completed before transmission of a next codeword. This is true even if two contiguous codewords contain errors. The error correction system will correct the two contiguous codewords by performing the steps above, while subsequent codewords are simultaneously being transferred from the recording device to the RAM.

This asynchronous approach allows the error correcting system to operate much slower than the prior art. Thus, the error correcting system can be implemented with fewer pipelined stages to decrease the latency, and each pipelined stage can be implemented with less complex circuitry to decrease the associated cost.

SYSTEM COMPONENTS

Figure 3A:
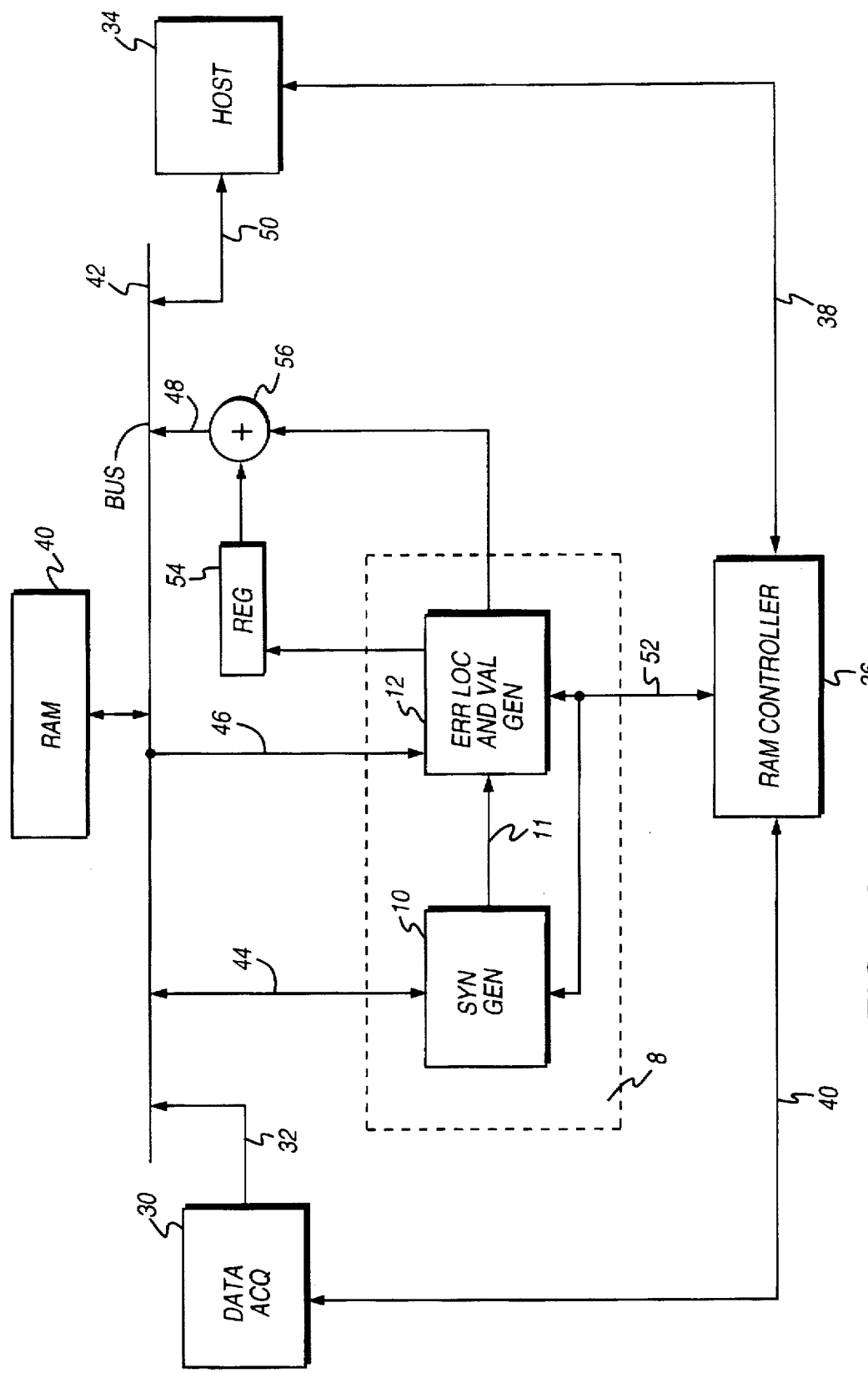
FIG. 3A and 3B are block diagrams of a first and second embodiment of the data path controller of the present invention.

Referring now to FIG. 3A, shown is a block diagram of an embodiment of an asynchronous data path controller. A host system 34 sends requests through a data path to write and read data from a recording device 30 (e.g., an optical or magnetic disk). The data path comprises a random access memory (RAM) 40 for storing the data transferred between the host and the recording device. The RAM is accessed through a common bus 42. An error correcting system 8 is connected to the bus 42 for detecting and correcting errors in the data read from the recording device before it is transferred to the host. The operation of the error correction is read/correct/write. That is, codewords are read from RAM 40, corrected, then written back to the RAM 40. The corrected codewords are subsequently transferred asynchronously from RAM 40 to the host system 34.

The error correcting system implements a conventional error correcting algorithm such as linear block decoding or Reed-Solomon decoding. Further, the error correcting system is capable of correcting different types of errors such as burst errors or random errors. Error correcting algorithms are well known by those skilled in the art and described in a variety of references and textbooks. A detailed description of error correcting algorithms is not necessary to understand the present invention.

A RAM controller 36 (implemented, for example, as a CPU or state machine) coordinates the data transfers to and from RAM 40. Data is transferred between the recording device and the RAM over line 32, the error correcting device and the RAM over lines 44, 46, and 48, and the host and the RAM over line 50. Before accessing the RAM, a request is sent to the RAM controller which arbitrates control over bus 42. The recording device sends a request to access the RAM over control line 40, and receives a response over the same. The error correcting system and host send requests and receive responses over control lines 52 and 38, respectively. RAM access locations are transferred by the RAM controller over the control lines to direct where in RAM the data should be stored or retrieved. Well known ring buffer or FIFO stack techniques are employed by the RAM controller to coordinate access to RAM 40.

The error correcting system is typically comprised of a syndrome generator 10 and an error location and error value generator 12. To correct a codeword, the error correcting system stores the data to be corrected in register 54. Then, an error value is added to the corrupt data (modulo-two) with adder 56. The corrected data is applied over line 48 to the RAM bus 42 and stored back into the RAM 40.

The recording device, error correcting system, and host system are continuously accessing the Ram. However, the recording device normally operates slower than data is transferred to and from the RAM. Also, RAM access is faster than the data transfer rate to the host system. Consequently, the RAM controller interleaves access to the RAM in order to maximize throughput. The interleave interval may be as small as one byte per transfer. The recording device has the highest RAM access priority to prevent overflow of its buffer. Next in priority is the error correcting system and then the host system.

OPERATION OVERVIEW

Referring again to FIG. 3A, user data is encoded into codewords and recorded onto the recording device 30 over line 32. On readback, the host system 34 transmits a read request to the RAM controller 36 over line 38. The RAM controller 36 transmits the read request and a RAM access location to the recording device 30 over line 40. The recording device 30 begins to read a block of data from the storage medium (e.g., optical or magnetic) according to the read request. Normally, the recording device will store several bytes in a buffer (not shown) before transmitting them to the RAM 40.

A. Recording Device to RAM

When the recording device is ready to transfer data to the RAM, it sends an access request to the RAM controller 36 over line 40. However, another component, such as the error correcting system, may already be accessing the RAM since the system operates asynchronously. Thus, the RAM controller arbitrates control of the RAM bus 42 and sends an access granted command to the recording device over line 40 when the RAM bus 42 is free.

While the recording device is waiting to transfer data to the RAM, data from the recording medium continues to be read and stored in the recording device's resident buffer. Therefore, the RAM controller must grant the recording device access to the RAM before the recording device's buffer is exhausted. Once the recording device is granted access to the RAM, the codeword bytes (including user data and redundancy) are transferred from the recording devices buffer to the RAM over line 32. The recording device then signals the RAM controller over line 40 that the transfer is completed. This process continues until at least one complete codeword has been transferred to the RAM. The RAM controller then signals the error correcting system 8 to process the codeword.

B. RAM to Error Correcting System

In the embodiment shown in FIG. 3A, the entire codeword, including the redundancy, is transferred to the RAM 40 over line 32. The RAM controller 36 signals the error correcting system over line 52 by sending it the address corresponding to the start and length of the uncorrected codewords. Because the error correcting system operates asynchronously, it may not be finished correcting previous data, and if so, the signal from the RAM controller is either ignored or queued. Once the error correcting system 8 is ready to process more data, it either de-queues a previous command or waits for one from the RAM controller. The error correcting system 8 then sends a RAM access request to the RAM controller 36 over line 52. The RAM controller 36 arbitrates the request and responds with an access granted command over line 52.

After gaining control of the RAM bus 42, the error correcting system reads a byte of an uncorrected codeword from RAM over line 44 and immediately releases the RAM bus 42 so that another device, such as the recording device, can access the RAM. Also, the error correcting system sends another RAM access request to the RAM controller in order to retrieve the next byte of the codeword. Once the entire codeword has been read, it is processed by the syndrome generator 10 to produce an error syndrome. During generation of the syndromes, the recording device continues to transfer new data to the RAM asynchronously, and corrected data is transferred to the host system.

In most cases, the syndrome will not indicate the presence of an error and the next uncorrected codeword will be processed. If an error is detected, the error syndrome is transferred to the error location and error value generator 12 over line 11. Then, the location and value of the error in the codeword is determined using well known error correcting algorithms, and at the same time, another codeword is read from the RAM into the syndrome generator 44 for concurrent generation of the next syndrome. After determining the location and value of an error, the byte of the codeword in error is read by the error correcting system from RAM 40 over line 46 and stored into register 54. Then, the incorrect byte is added (modulo-two) to the correction value with adder 56, and the corrected data is restored into the RAM 40 over line 48. The error correcting system 8 notifies the RAM controller 36 over line 52 that data is available for transfer to the host system. Again, access to the RAM is always arbitrated by the RAM controller 36. If the syndrome generator 10 generates a non-zero syndrome indicating an error, and the error location and value generator 12 is not finished processing the previous syndrome, then the syndromes are queued. Later, the error locations and values are determined sequentially for each of the queued syndromes.

Figure 3B:
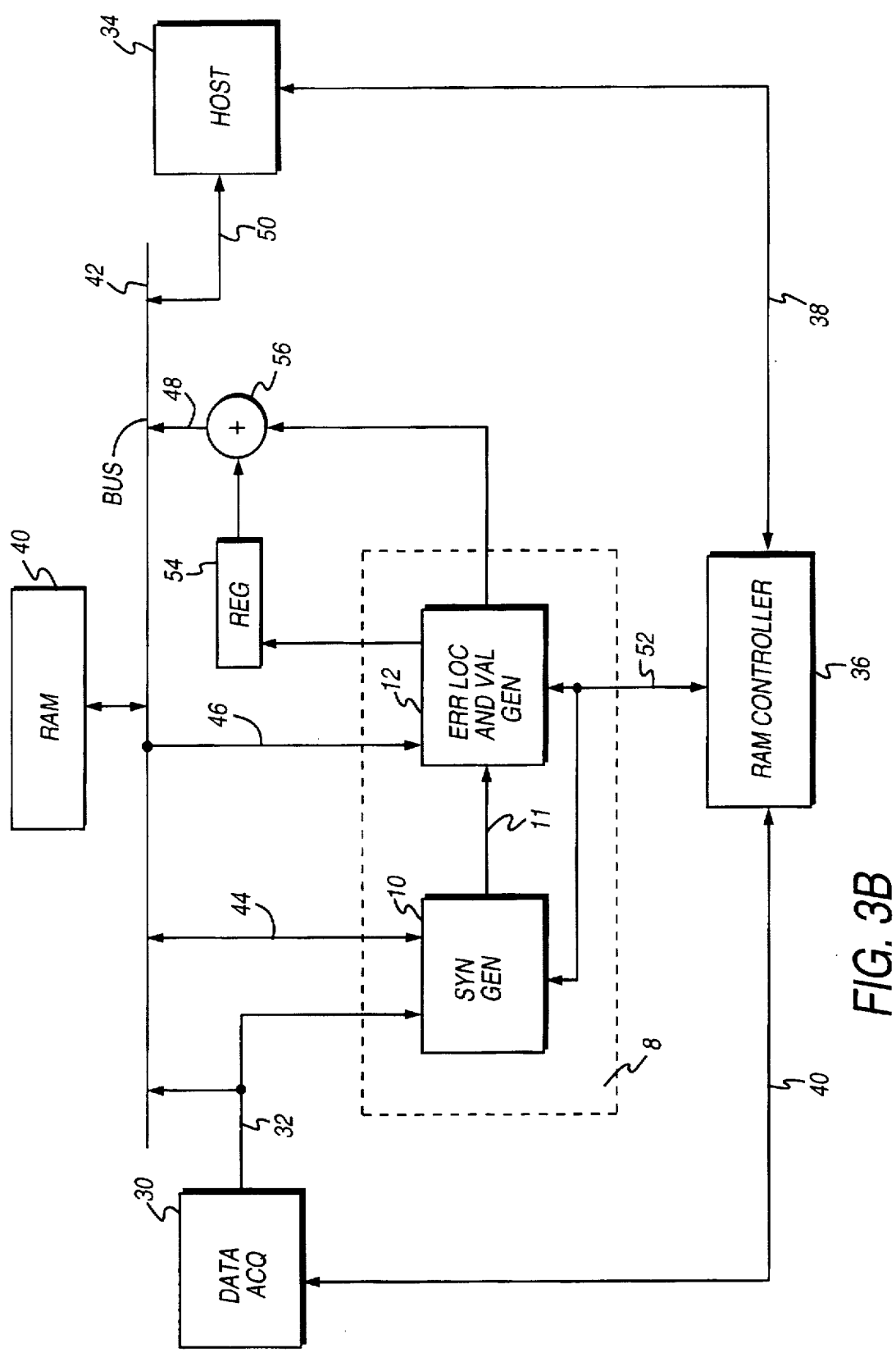

In an alternative embodiment shown in FIG. 3B, the codewords are transferred to both the RAM 40 and the syndrome generator 10 over line 32. The syndromes are generated immediately and those indicating errors are stored into the RAM 40 over line 44. Only the user data portion of the codeword is stored into RAM 40 since the syndromes are generated from the redundancy part of the codeword as they are read from the recording device. Rather than transfer the syndromes from the syndrome generator 10 to the error location and error value generator 12, the later reads the syndromes from RAM 40 and corrects the corresponding codewords similar to the embodiment of FIG. 3A. This increases the overall speed of the data channel since the syndrome generator 10 does not read the codewords from RAM 40 to generate the syndromes.

Since the syndromes must be generated for every codeword transferred from the recording device, the syndrome generator 10 must operate relatively fast to achieve on-the-fly operation. The error location and error value generator 12, however, must correct only a few codewords out of several. Therefore, the error location and value generator 12 need only operate at speeds relative to the fractional part of RAM that contains corrupted codewords.

Either or both the syndrome generator 10 and error location and value generator 12 can be broken into pipelined stages using well known techniques so that several codewords can be processed concurrently. As mentioned previously, pipelining the error correcting system simplifies the circuitry and increases throughput, but increases the overall latency. However, the asynchronous characteristics of the present invention provides the greatest flexibility between these factors while still achieving on-the-fly operation.

C. RAM to Host System

When the RAM controller 36 receives notification from the error correcting system 8 that data has been checked and corrected as necessary, the RAM controller notifies the host 34 over line 38 by sending it the starting address and length of the available data. The host 36 replies over line 38 with a RAM access request, and when access is granted by the RAM controller 36, the data is transferred to the host. When the transfer is finished, the host 34 notifies the RAM controller to update its status. The portion of the RAM just transferred to the host is updated by the RAM controller as available to store further data transferred from the recording device.

D. Operation of RAM as cache

The RAM in the data path controller of the present invention can also be used advantageously as a cache. Using cache memory to extend the operation of a storage device is well known. When the host writes data to the storage device, it is buffered into the cache memory rather than writing it immediately to the recording device. Since transferring data to cache memory is much faster than transferring data to the recording device, the storage system appears to operate at the access-time of the memory. The data stored in the cache memory is later transferred to the recording device in the background and transparent to the host system. When the host system reads a block of data from the storage device, several contiguous blocks are read into the cache memory. If the host system subsequently requests one of the contiguous blocks already in cache memory, it can be transferred immediately. Utilizing memory in this type of cache system significantly increases the overall speed of the storage system.

Referring now to FIG. 3A, when the host system 34 writes a block of data to the storage system, the data is stored into the RAM 40 over line 50. The RAM controller 36 provides the address in RAM 40 to store the data and arbitrates the transfer. When the transfer is complete, the host system is notified so that more data can be transferred. Once RAM 40 contains several data blocks, the RAM controller 46 transfers the data blocks to the recording device 30 in the most efficient sequence. In recording devices that employ rotating disks (such as optical or magnetic), it is more efficient to write data blocks in a contiguous manner as the head passes over the target track on the medium. Further, the data blocks are written to the disk in a sequence that minimizes the write head distance. For instance, rather than writing data blocks that results in a track sequence of {2, 40, 20}, the RAM controller writes the data blocks so that the track sequence is {2, 20, 40}.

When the host system reads a block of data from the storage system, the RAM controller 36 reads the block requested and several contiguous blocks from the recording device 30 into RAM 40. The data blocks are also corrected by the error correcting system 8. If the host system makes a subsequent request for one of the contiguous blocks already in RAM 40, the block is transferred immediately.

The objects of the present invention have been fully realized through the disclosed asynchronous data path controller. Specifically, the data path controller employs a RAM and RAM controller to transfer data from the recording device, correct it, and transfer it to the host system in asynchronous steps. This allows the error correcting system to operate much slower than in conventional data path controllers. Consequently, the error correction algorithm can be implemented using cost effective circuitry and having a shorter pipeline to minimize the latency. Although the invention has been disclosed in a preferred embodiment, many changes in form are conceivable without departing from the spirit and scope of the invention as more appropriately construed with reference to the following claims.

We claim:

1. An asynchronous data path controller connected to receive recorded data from a digital recording device for transfer to a host system, wherein the recorded data comprises a plurality of multi-dimensional product codewords, wherein each multi-dimensional product codeword comprises a plurality of one-dimensional codewords comprising user data and redundancy symbols, comprising:

(a) a RAM connected to receive and store at least three product codewords of recorded data from the digital recording device;

(b) an error correcting system comprised of an error syndrome generator and an error location and error value generator connected to receive the recorded data from the RAM, for correcting errors in the recorded data and storing corrected data back into the RAM, wherein the error syndrome generator generates an error syndrome in response to the recorded data and transmits the error syndrome to the error location and error value generator for generating an error location and an error correction value;

(c) an output for transferring data stored in the RAM to the host system; and (d) a controller for transferring in concurrent, asynchronous operations the recorded data from the digital recording device to the RAM, the recorded data from the RAM to the error correcting system, and the data stored in the RAM to the host.

2. The asynchronous data path controller as recited in claim 1, wherein the controller arbitrates access to the RAM.

3. The asynchronous data path controller as recited in claim 2, wherein the controller keeps track of a recording device access location, an error correcting system access location, and a host system access location, wherein said access locations are utilized, respectively, by:

(a) the digital recording device to store the recorded data into the RAM;

(b) the error correcting system to read uncorrected data from the RAM and write the corrected data back into the RAM; and (c) the host system for reading data stored in the RAM, and for writing data to the RAM to be stored on the recording device.

4. The asynchronous data path controller as recited in claim 1, further comprising a register wherein the error correcting system:

(a) loads the register with uncorrected data from the RAM corresponding to the error location;

(b) adds the error correction value modulo-two to the uncorrected data to generate corrected data; and (c) stores the corrected data back into the RAM.

5. The asynchronous data path controller as recited in claim 1, wherein the RAM is utilized as a cache RAM.

6. The asynchronous data path controller as recited in claim 5, wherein a data block from the host to be written to the digital recording device in response to a write command is stored in the RAM.

7. The asynchronous data path controller as recited in claim 6, wherein a plurality of data blocks stored in the RAM are transferred to the digital recording device.

8. The asynchronous data path controller as recited in claim 5, wherein a plurality of contiguous data blocks are read from the digital recording device and stored into the RAM in response to a command from the host to read a data block from the recording device.

9. The asynchronous data path controller as recited in claim 8, wherein one of the plurality of contiguous data blocks stored in the RAM is transferred to the host in response to a command from the host to read a data block from the digital recording device.

10. A data path controller for processing data from a digital recording device wherein the data is in a product code format, comprising:

(a) a RAM connected to receive the data from the digital recording device;

(b) an error correcting system connected to receive a row codeword from the RAM and generating a first syndrome in response thereto, and connected to receive a column codeword from the RAM and generating a second syndrome in response thereto, the first and second syndrome for use in correcting errors in the row and column codewords, the error correcting system storing corrected data back into the RAM;

(c) an output for transferring the data from the RAM to the host system; and (d) a controller for transferring in concurrent, asynchronous operations the recorded data from the digital recording device to the RAM, the recorded data from the RAM to the error correcting system, and the data stored in the RAM to the host.

11. A method for reading, correcting, and transferring recorded data from a digital recording device to a host system, wherein the recorded data comprises a plurality of codewords wherein each codeword comprises user data and redundancy symbols, comprising the steps of:

(a) transferring the recorded data from the digital recording device to a RAM;

(b) reading the recorded data from the RAM and generating an error syndrome;

(c) generating an error location and an error correction value in response to the error syndrome;

(d) reading uncorrected data from the RAM corresponding to the error location;

(e) correcting the uncorrected data using the error correction value to generate corrected data;

(f) storing the corrected data back into the RAM; and (g) transferring data stored in the RAM to the host system;

wherein the steps (a)–(g) occur concurrently and asynchronously.

12. The method as recited in claim 11, further comprising the step of arbitrating access to the RAM.

13. The method as recited in claim 11, wherein the steps (a)–(g) are executed on-the-fly.

* * * * *